July 8, 1969    C. M. CIALELLA    3,454,770

DIRECTIONAL RADIATION DETECTOR

Filed Oct. 18, 1966

INVENTOR
CARMEN M. CIALELLA

BY Harry M. Saragovitz,
Edward J. Kelly
& Herbert Berl    ATTORNEYS

United States Patent Office 3,454,770
Patented July 8, 1969

3,454,770
DIRECTIONAL RADIATION DETECTOR
Carmen M. Cialella, Aberdeen, Md., assignor to the United States of America as represented by the Secretary of the Army
Filed Oct. 18, 1966, Ser. No. 588,254
Int. Cl. H01j 35/16, 1/52; G21f 5/02
U.S. Cl. 250—105                5 Claims

ABSTRACT OF THE DISCLOSURE

A method and apparatus for detecting the direction of incoming radiation by placing a shell shaped radiation detector in the breech of a tank gun, pointing the gun barrel in the direction of the radiation and measuring the radiation.

---

The invention described herein may be manufactured and used by or for the Government, for governmental purposes, without the payment to me of any royalty thereon.

In a tactical situation following a nuclear detonation there would exist areas of high gamma ray intensity due to fallout. It would be of extreme importance for an individual tank commander to be able to locate the direction of these high dose level areas with respect to his present vehicle location in order to either avoid them or to investigate their levels of intensity and their extent. If, following a nuclear detonation, the tank commander finds his vehicle within a high intensity fallout field it would be of extreme importance for him to be able to quickly find the shortest route out of the field.

The present invention, by providing the tank commander with the capability of measuring gamma ray intensity as a function of incident direction, enables him to perform these functions.

Figure 1:
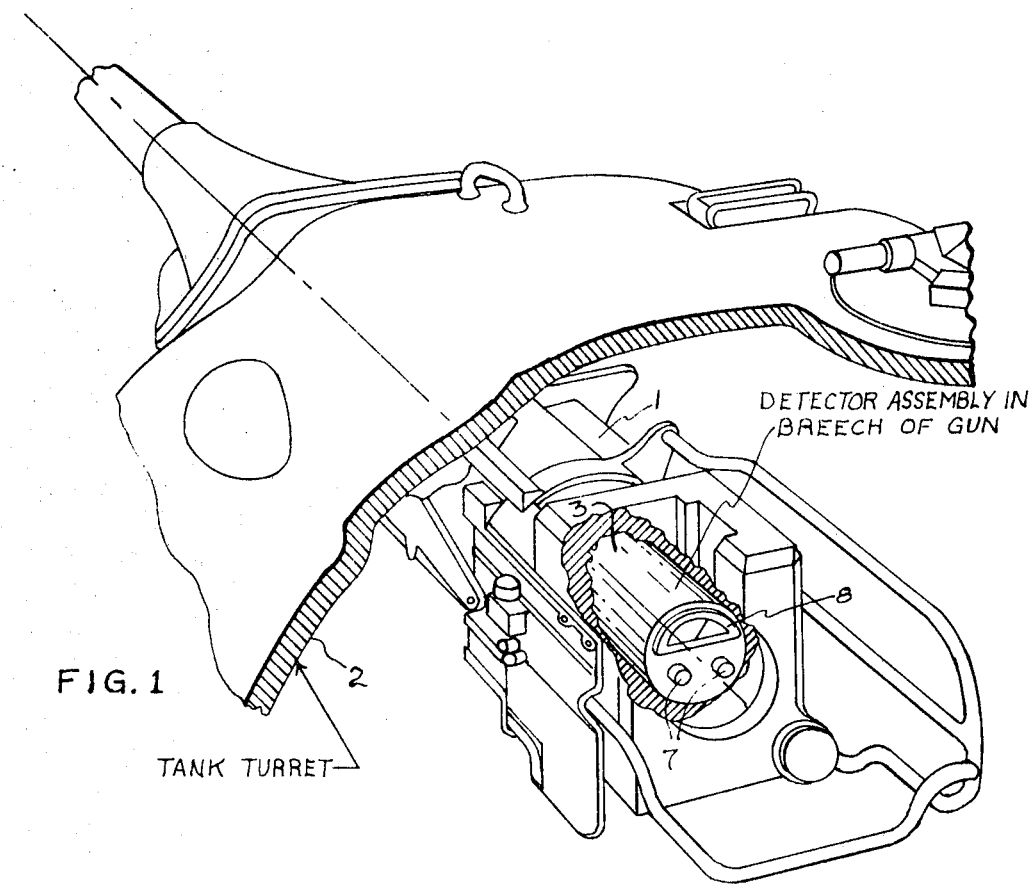
Figure 2:
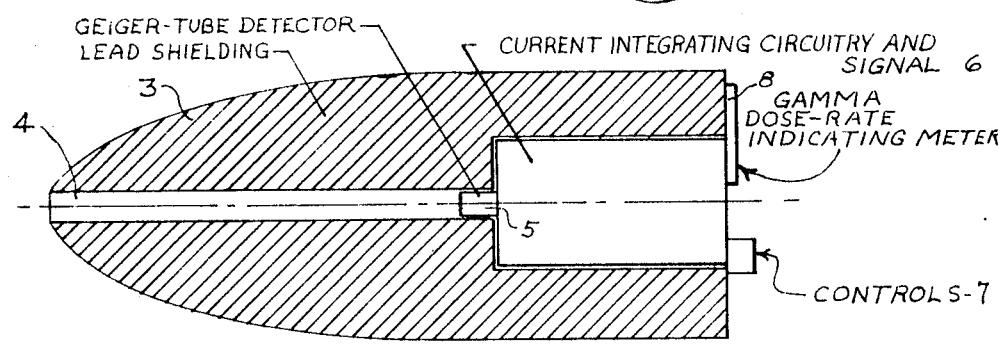

In the accompanying drawings:

FIG. 1 is a view of an embodiment of the detector assembly in the breech of a gun; and FIG. 2 is a cross section through an embodiment of the detector assembly.

The present invention may be used in conjunction with a rifle or other type of gun or similar instrument. It is here illustrated in the breech of a gun 1 mounted in the turret 2 of a tank. Shielding material 3 may be shaped similar to a projectile to be inserted in the gun. Passageway 4 is of a small size if a high degree of directional detection is required, or may be larger to admit greater radiation if a lower degree of precision is adequate.

A detector 5, e.g., a Geiger-tube detector, is positioned to detect incoming radiations. Non-saturating current integrating circuitry and signal means 6, and controls 7, of known construction, may be used in conjunction with the detector to give an indication of the intensity of incoming radiations.

If desired a meter 8, such as a gamma dose-rate indicating meter, may be located in the vicinity of the detector apparatus. Thus, personnel in the area may be apprised of the quantity of dangerous radiation to which they have been subjected.

The system may be battery operated or vehicle power operated. The instrument may be mounted as an exact duplicate of the shells used by the vehicle's gun system. It may be shielded with lead in all directions except for bore 4 from the front of the shell to the detector. To make a directional measurement the detector system is placed in the gun breech. This position takes advantage of the additional shielding of the tank turret in all directions except down the length of the gun barrel. By rotating the turret, or elevating the gun barrel, or both, measurements can be made at any azimuth and at a wide range of elevation angles.

The system can be adapted to a variety of gun systems and shell sizes. With smaller shells the internal lead shielding can be eliminated and the directional capability can still be maintained by utilizing the combined shielding of the turret and the sides of the gun barrel. It can also be adapted to future systems. Even the bare shell, with inetrnal lead shielding and a cylindrical hole therethrough, would provide a capability for directional measurements without benefit of the shielding of the turret and gun barrel.

What is claimed is:

1. Directional radiation detecting equipment comprising the combination of a gun barrel shield to admit radiation down the barrel from one direction only and block radiations from all other directions, detectaor means comprising apparatus for insertion in the gun barrel, as a substitute for a shell, and circuitry and signal means connected with said detector means to indicate the magnitude of radiations passing down the gun barrel.

2. Equipment as in claim 1, and additional directional radiation shield comprising the shielding turret about a gun.

3. Equipment as in claim 1, and a gamma dose-rate indicator mounted in proximity to said detector means.

4. Equipment as in claim 1, wherein said shield further comprises shielding material somewhat shell-shaped with a cylindrical longitudinal passageway therein.

5. The method of detecting the direction of incoming radiations which comprises placing a radiation detector in the breech of a gun, pointing the gun barrel in the direction of possible radiation and checking the radiation.

References Cited
UNITED STATES PATENTS 3,028,493   4/1962   Takahashi _____ 250—105

RALPH G. NILSON, *Primary Examiner.*

MORTON J. FROME, *Assistant Examiner.*

U.S. Cl. X.R.

250—83